(12) United States Patent
Gulcu et al.

(10) Patent No.: US 11,366,699 B1
(45) Date of Patent: Jun. 21, 2022

(54) HANDLING BULK REQUESTS FOR RESOURCES

(71) Applicant: SAS Institute Inc., Cary, NC (US)

(72) Inventors: Altan Gulcu, Cary, NC (US); Xiaodong Yao, Cary, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 17/670,104

(22) Filed: Feb. 11, 2022

Related U.S. Application Data

(60) Provisional application No. 63/223,065, filed on Jul. 19, 2021.

(51) Int. Cl.
   *G06F 9/46* (2006.01)
   *G06F 9/50* (2006.01)
   *G06F 9/455* (2018.01)

(52) U.S. Cl.
   CPC ........ *G06F 9/5044* (2013.01); *G06F 9/45558* (2013.01); *G06F 9/5038* (2013.01); *G06F 9/5055* (2013.01); *G06F 9/5077* (2013.01); *G06F 2009/4557* (2013.01)

(58) Field of Classification Search
   CPC .................................................. G06F 9/45558
   USPC .......................................................... 718/104
   See application file for complete search history.

(56) References Cited

U.S. PATENT DOCUMENTS

| | | | | |
|---|---|---|---|---|
| 6,968,323 B1* | 11/2005 | Bansal | ............... | G06Q 30/0283 379/309 |
| 6,993,494 B1* | 1/2006 | Boushy | ............... | G06Q 20/387 705/14.1 |
| 7,900,005 B2* | 3/2011 | Kotsovinos | ........... | G06F 9/5083 711/E12.103 |
| 8,321,286 B2* | 11/2012 | McDaniel | ............ | G06Q 10/063 705/5 |
| 8,539,197 B1* | 9/2013 | Marshall | ............... | G06F 3/0613 711/112 |
| 8,789,041 B2* | 7/2014 | Verma | ................. | G06F 9/45558 718/1 |
| 9,466,080 B2* | 10/2016 | Fan | .................... | G06Q 30/0601 |
| 9,477,531 B2* | 10/2016 | Chawla | ............... | G06F 9/45558 |
| 9,558,232 B1* | 1/2017 | Taylor | ................... | G06F 3/0659 |
| 10,210,023 B2* | 2/2019 | Dimnaku | .................. | G06F 9/50 |
| 10,402,364 B1* | 9/2019 | Vajravel | ............... | H04L 67/141 |
| 10,564,847 B1* | 2/2020 | Taylor | ................. | G06F 3/0658 |
| 11,010,083 B2* | 5/2021 | Feng | .................... | G06F 3/0647 |

(Continued)

*Primary Examiner* — Mehran Kamran
(74) *Attorney, Agent, or Firm* — Kilpatrick Townsend & Stockton LLP

(57) ABSTRACT

Some examples describes herein relate to handling bulk requests for resources. In one example, a system can determine a bulk request parameter-value associated with a bulk request. The system can then predict a baseline benefit value, which can be a benefit value when the bulk request parameter-value is used as a lower boundary for a unit parameter-value. The system can also determine a lower boundary constraint on the unit parameter-value independently of the bulk request parameter-value. The system can then execute an iterative process using the baseline benefit value and the lower boundary constraint. Based on a result of the iterative process, the system can determine whether and how much the bulk request parameter-value should be adjusted. The system may adjust the bulk request parameter-value accordingly or output a recommendation to do so.

30 Claims, 17 Drawing Sheets

(56) References Cited

U.S. PATENT DOCUMENTS

| | | | |
|---|---|---|---|
| 11,157,643 B2 * | 10/2021 | Malliah | H04W 12/084 |
| 2010/0107173 A1 * | 4/2010 | Chassin | G06Q 20/102 |
| | | | 718/104 |
| 2011/0154320 A1 * | 6/2011 | Verma | G06F 9/45558 |
| | | | 718/1 |
| 2021/0081769 A1 * | 3/2021 | Chen | G06F 8/45 |
| 2021/0136178 A1 * | 5/2021 | Casey | G06N 20/00 |

* cited by examiner

Bulk Request Details:

1604a — Evaluation Type: Existing Bulk Request
1604b — Search By: Date
1604c — Group Name: Cloud_VM_Bulk1
1604d — Duration: 5 days
1604e — Start Date: 11-Dec-2022

| # | Date | Units | Units Available / Total Units | Current Value | Optional Value | Optional Value | Optional Value |
|---|------|-------|-------------------------------|---------------|----------------|----------------|----------------|
| 1 | 11-Dec-2022 | 305 | 3686 / 3933 | 211.00 | 211.00 | 200.00 | 211.00 |
| 2 | 12-Dec-2022 | 393 | 3626 / 3933 | 162.00 | 162.00 | 162.00 | 150.00 |
| 3 | 13-Dec-2022 | 424 | 3673 / 3933 | 162.00 | 162.00 | 162.00 | 150.00 |
| 4 | 14-Dec-2022 | 340 | 3763 / 3933 | 172.00 | 162.00 | 162.00 | 150.00 |
| 5 | 15-Dec-2022 | 101 | 4099 / 3933 | 172.00 | 162.00 | 162.00 | 150.00 |

GO! — 1610

Results:

| Optional Value 1 | Optional Value 2 | Optional Value 3 |
|------------------|------------------|------------------|
| Expected Increase: 9216.02 | Expected Increase: 2606.084 | Expected Increase: 1641.50 |

FIG. 16

HANDLING BULK REQUESTS FOR RESOURCES

REFERENCE TO RELATED APPLICATIONS

This claims the benefit of priority under 35 U.S.C. § 119(e) to U.S. Provisional Patent Application No. 63/223,065, filed Jul. 19, 2021, the entirety of which is hereby incorporated by reference herein.

TECHNICAL FIELD

The present disclosure relates generally to handling resource requests. More specifically, but not by way of limitation, this disclosure relates to handling bulk requests for resources, such as virtual machines in a cloud computing environment.

BACKGROUND

Cloud service providers and other service providers may provide entities with access to products or services, which can be supplied as units that can be bought or leased individually or in groups. Examples of the units can include cloud resources such as processors, memory, storage space, virtual machines, microservices, and serverless functions; spaces such as lodging or offices; and equipment such as tractors, robots, turbines, and pumps. There is typically a finite number of such units available. In some cases, an entity may make a bulk request to reserve a group of units during a target timeframe. Such bulk requests may be made well in advance of the target timeframe, such as months or years in advance. Other entities may make ad-hoc requests for units closer to, or during, the timeframe when the units are needed.

SUMMARY

One example of the present disclosure includes a system that has one or more processors and one or more memory devices including program code that is executable by the one or more processors for causing the one or more processors to perform operations. The operations can include setting a boundary reference value to a first default value in memory; setting a gain reference value to a second default value in the memory; and determining a bulk request parameter-value assigned to a bulk request, wherein the bulk request is for reserving a group of units during a selected timeframe, and wherein the bulk request parameter-value is a value for a parameter assigned to the bulk request. The operations can include predicting a baseline benefit value based on the bulk request parameter-value, the baseline benefit value being predicted by using the bulk request parameter-value as a lower boundary for a unit parameter-value, the unit parameter-value being another value for the parameter assigned to an individual unit during the selected timeframe. The operations can include determining a lower boundary constraint for the unit parameter-value independently of the bulk request parameter-value. The operations can include executing an iterative process. The iterative process can involve (a) determining a candidate parameter-value for the parameter based on the lower boundary constraint; (b) determining a new gain value based on the candidate parameter-value and the baseline benefit value; (c) in response to determining that the new gain value is greater than the gain reference value: setting the gain reference value to the new gain value; and setting the boundary reference value to the lower boundary constraint; (d) in response to determining that the candidate parameter-value is less than a threshold value: updating the lower boundary constraint based on the candidate parameter-value; and returning to operation (a); and (e) in response to determining that the candidate parameter-value is greater than or equal to the threshold value: exiting the iterative process. The operations can include, subsequent to exiting the iterative process, determine whether the gain reference value is greater than zero. The operations can include, based on determining that the gain reference value is greater than zero, adjust the bulk request parameter-value to the boundary reference value.

Another example of the present disclosure includes a non-transitory computer-readable medium comprising program code that is executable by one or more processors for causing the one or more processors to perform operations. The operations can include setting a boundary reference value to a first default value in memory; setting a gain reference value to a second default value in the memory; and determining a bulk request parameter-value assigned to a bulk request, wherein the bulk request is for reserving a group of units during a selected timeframe, and wherein the bulk request parameter-value is a value for a parameter assigned to the bulk request. The operations can include predicting a baseline benefit value based on the bulk request parameter-value, the baseline benefit value being predicted by using the bulk request parameter-value as a lower boundary for a unit parameter-value, the unit parameter-value being another value for the parameter assigned to an individual unit during the selected timeframe. The operations can include determining a lower boundary constraint for the unit parameter-value independently of the bulk request parameter-value. The operations can include executing an iterative process. The iterative process can involve (a) determining a candidate parameter-value for the parameter based on the lower boundary constraint; (b) determining a new gain value based on the candidate parameter-value and the baseline benefit value; (c) in response to determining that the new gain value is greater than the gain reference value: setting the gain reference value to the new gain value; and setting the boundary reference value to the lower boundary constraint; (d) in response to determining that the candidate parameter-value is less than a threshold value: updating the lower boundary constraint based on the candidate parameter-value; and returning to operation (a); and (e) in response to determining that the candidate parameter-value is greater than or equal to the threshold value: exiting the iterative process. The operations can include, subsequent to exiting the iterative process, determine whether the gain reference value is greater than zero. The operations can include, based on determining that the gain reference value is greater than zero, adjust the bulk request parameter-value to the boundary reference value.

Yet another example of the present disclosure includes a method that can be performed by one or more processors. The method can include setting a boundary reference value to a first default value in memory; setting a gain reference value to a second default value in the memory; and determining a bulk request parameter-value assigned to a bulk request, wherein the bulk request is for reserving a group of units during a selected timeframe, and wherein the bulk request parameter-value is a value for a parameter assigned to the bulk request. The method can include predicting a baseline benefit value based on the bulk request parameter-value, the baseline benefit value being predicted by using the bulk request parameter-value as a lower boundary for a unit parameter-value, the unit parameter-value being another value for the parameter assigned to an individual unit during the selected timeframe. The method can include determining a lower boundary constraint for the unit parameter-value independently of the bulk request parameter-value. The method can include executing an iterative process. The iterative process can involve (a) determining a candidate parameter-value for the parameter based on the lower boundary constraint; (b) determining a new gain value based on the candidate parameter-value and the baseline benefit value; (c) in response to determining that the new gain value is greater than the gain reference value: setting the gain reference value to the new gain value; and setting the boundary reference value to the lower boundary constraint; and (d) in response to determining that the candidate parameter-value is less than a threshold value: updating the lower boundary constraint based on the candidate parameter-value; and returning to operation (a). The method can include exiting the iterative process. The method can include, subsequent to exiting the iterative process, determine whether the gain reference value is greater than zero. The method can include, based on determining that the gain reference value is greater than zero, adjust the bulk request parameter-value to the boundary reference value.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 16 shows an example of a graphical user interface according to some aspects of the present disclosure.

Figure 1:
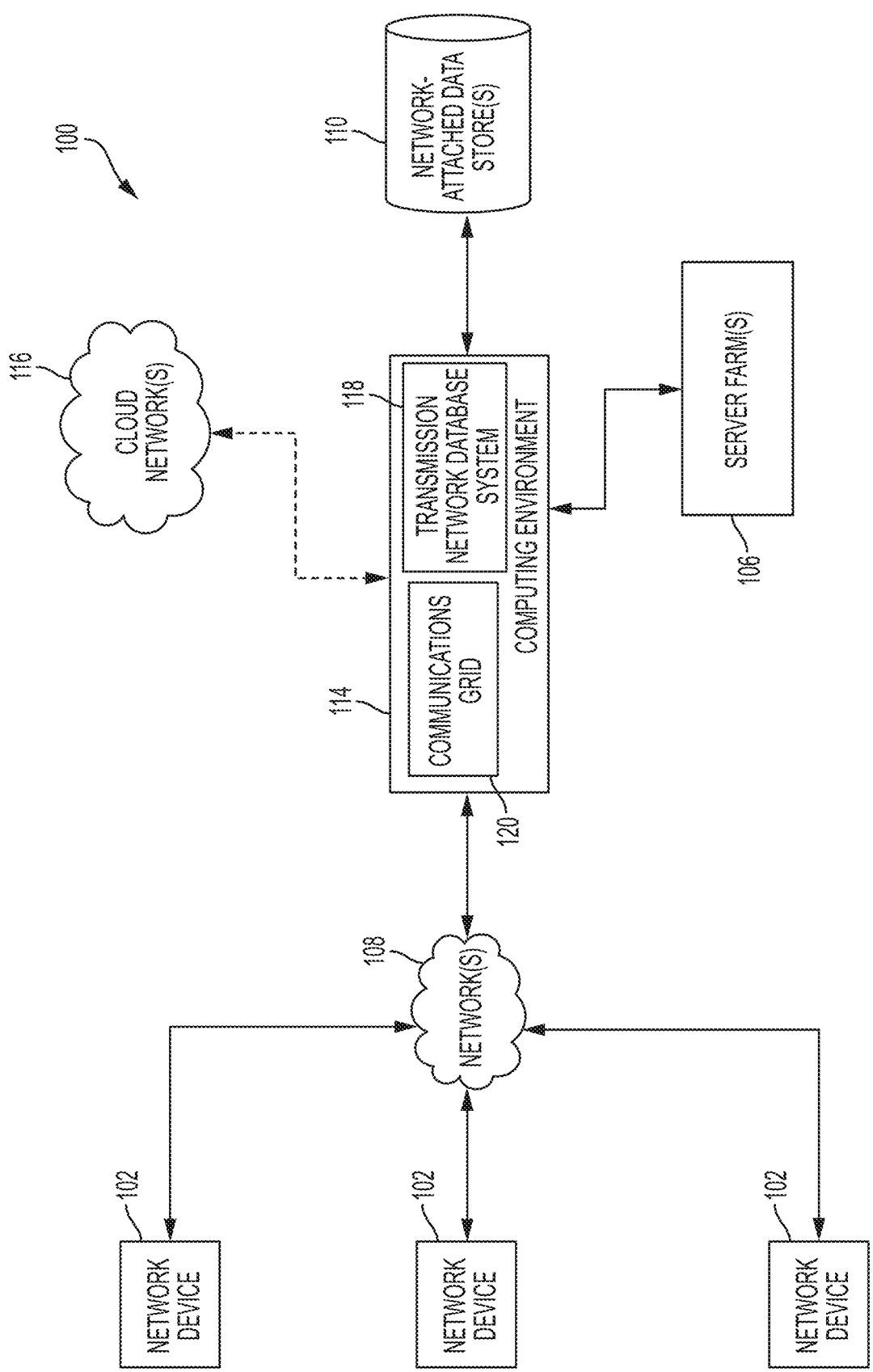
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

In various industries, users can issue bulk requests and ad-hoc requests to access units provided by a service provider. Service providers often prefer bulk requests, because bulk requests are generally provided well in advance of a selected timeframe in which the units are needed and guarantee a certain amount of resource usage during that timeframe. For example, a cloud service provider may prefer bulk requests for virtual machines over ad-hoc requests, because the bulk requests allow the service provider to better predict and manage loading on the cloud computing system.

To help incentivize bulk requests, a service provider may guarantee a bulk requestor that a parameter value assigned to the bulk request will be more desirable than the parameter value assigned to individual units during the selected timeframe. As one example, a bulk requestor may submit a request to a cloud service provider to reserve a group of virtual machines during a selected timeframe. In return, the cloud service provider may guarantee the bulk requestor that a parameter value assigned to the bulk request will be more preferable than the parameter value assigned to individual virtual machines during that same timeframe. Examples of the parameter can include a quality of service (QoS) parameter, cost parameter, priority parameter, network bandwidth parameter, memory parameter, storage parameter, or latency parameter. The value of a parameter value assigned to the bulk request can be referred to as the bulk request parameter-value. The parameter value assigned to individual units during the selected timeframe can be referred to as the unit parameter-value. Due to this guarantee, the bulk request parameter-value can constrain (e.g., serve as a minimum or maximum for) the unit parameter-value during the selected timeframe.

In some cases, the abovementioned constraints can result in suboptimal resource usage or another suboptimal result. For example, these constraints may make it less desirable for users to access individual units from the service provider during the selected timeframe. So, users may use other service providers to handle their ad-hoc requests. This may result in underutilization of the original service provider's system. For instance, a bulk requestor may request a certain amount of cloud storage space from a cloud provider during a selected timeframe. In exchange, the cloud provider may give the bulk requestor a guarantee of the type described above. Due to this guarantee, the cloud provider may impose constraints on the parameter values for individual units of cloud storage space during the selected timeframe. The constraints may deter users that want to use the cloud provider's system on a more ad-hoc basis. As a result, those users may turn to other service providers to fulfill their requests, thereby causing the original cloud provider to have cloud storage space that goes unused. Underutilization of the cloud provider's system can have significant negative impacts on both the cloud provider and its users. For example, the system may not function properly or optimally if certain loading conditions are not met.

For the above reasons, system operators (e.g., individuals operating some aspect of the system) may monitor the impact of bulk requests in an effort to optimize resource usage or obtain another desired result. This may be facilitated using predictive software that can predict the number of ad-hoc requests likely to be received in relation to a target timeframe, based on user-specified parameter values. The system operator can execute the predictive software on a computer to determine whether a guarantee issued to a bulk requestor will negatively impact a target metric such as resource usage during a target timeframe (e.g., because it will significantly decrease the number of ad-hoc requests received in relation to the target timeframe). If so, the system operator may take action to reduce this negative impact. For example, the system operator may communicate with the bulk requestor to modify their arrangement in a way that yields an increased number of ad-hoc requests during the target timeframe, thereby increasing resource usage. Modifying the arrangement may involve adjusting the bulk request parameter-value so as to loosen the resultant constraints on the unit parameter-value. In more extreme circumstances, modifying the arrangement may involve retracting the guarantee altogether, but it is generally preferable for the system operator to work with the bulk requestor to adjust the bulk request parameter-value.

It can be challenging to determine whether and how much to adjust the bulk request parameter-value to achieve optimal resource usage or another desired result. For example, a user may need to repeatedly provide manual inputs to the predictive software and assess the results thereof to determine how to adjust a bulk request parameter-value to improve resource usage or achieve another desired result. This is largely a manual, subjective, slow, difficult, and tedious process that may require industry-specific expertise. Additionally, this process requires repeatedly executing the predictive software on a computer, which can consume significant amounts of computational power, electrical power, and computing resources such as memory and storage space.

Some examples of the present disclosure can overcome one or more of the abovementioned problems by providing a system that automatically executes an iterative process configured to identify a bulk request parameter-value that achieves a desired improvement, such as increased resource usage. More specifically, the system can determine a parameter value assigned to a bulk request for reserving a group of units during a selected timeframe. The system can then determine a benefit value associated with the scenario in which parameter values for individual units are constrained by the bulk request parameter-value. This benefit value can be referred to as a baseline benefit value. The baseline benefit value can quantify the benefit to a service provider of having the unit parameter-value constrained by the bulk request parameter-value. The system can also determine benefit values associated with the scenario in which the unit parameter-value is not constrained by the bulk request parameter-value. This can be achieved by executing an iterative process. In each iteration of the iterative process, the system can adjust the unit parameter-value in a way that is unconstrained by the bulk request parameter-value, determine whether the adjusted parameter value results in a benefit gain that is greater than was achieved in prior iterations and, if so, store the benefit gain. The benefit gain can quantify the amount of benefit there is to the service provider relative to the baseline benefit value. This iterative process can continue until a stopping condition is met, at which point the iterative process can end.

Once the iterative process ends, the system can determine whether the stored benefit gain is positive or negative. If the stored benefit gain is positive, it may mean that there is a greater benefit to the service provider in adjusting the bulk request parameter-value than in leaving the bulk request parameter-value as is. So, the system can generate a recommendation or execute an automated process to modify the bulk request parameter-value. The bulk request parameter-value can be modified to be equivalent to the unit parameter-value that yielded the stored benefit gain. If the stored benefit gain is negative, it may mean that there is a greater benefit to the service provider in leaving the bulk request parameter-value as is. So, the system can generate a recommendation to maintain the bulk request parameter-value as is.

Using the above techniques, the system can automatically determine whether the bulk request parameter-value should be adjusted as well as a new value for the bulk request parameter-value that achieves an improved result. The new value may be considered an optimal value determined through this optimization process. The system can then output a recommendation, or adjust the bulk request parameter-value, to achieve the improved result. For example, the system may automatically adjust the bulk request parameter-value to the new value, which can result in the receipt of a larger number of ad-hoc requests thereby increasing resource usage in a cloud computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for handling bulk requests and ad-hoc requests according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages all at once, or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data to a network-attached data store 110 for storage. The computing environment 114 may later retrieve the data from the network-attached data store 110 and use the data for handling bulk requests and ad-hoc requests.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the server farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for managing bulk requests and ad-hoc requests.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, and sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for handling bulk requests and ad-hoc requests. For example, the computing environment 114, a network device 102, or both can implement one or more versions of the processes discussed with respect to any of the figures.

Figure 2:
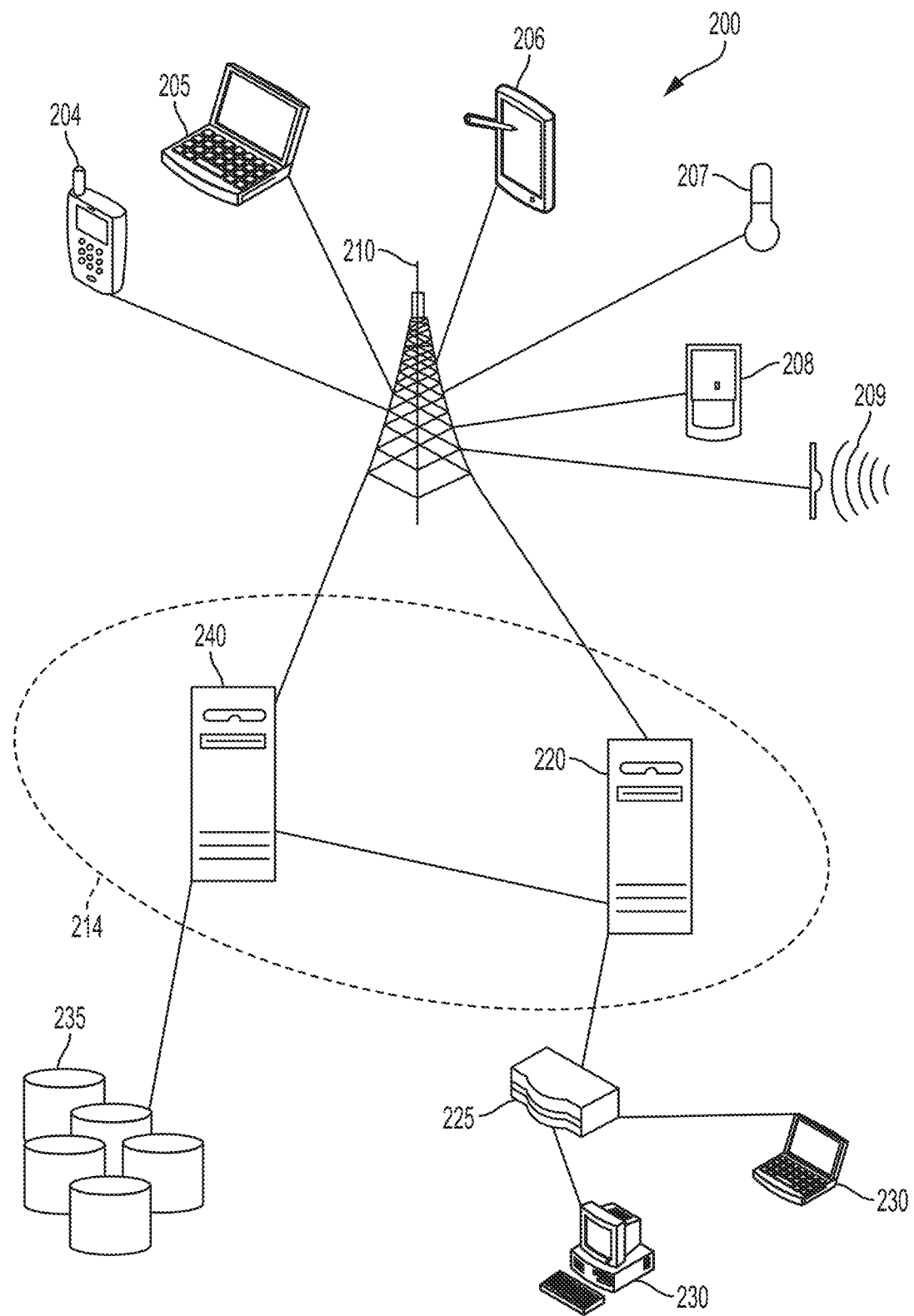
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source.

Devices within computing environment 214 may also perform pre-analysis on data it receives to determine if the data received should be processed as part of an ongoing project. For example, the computing environment 214 can perform a pre-analysis of the data. The pre-analysis can include determining whether the data is in a correct format and, if not, reformatting the data into the correct format.

Figure 3:
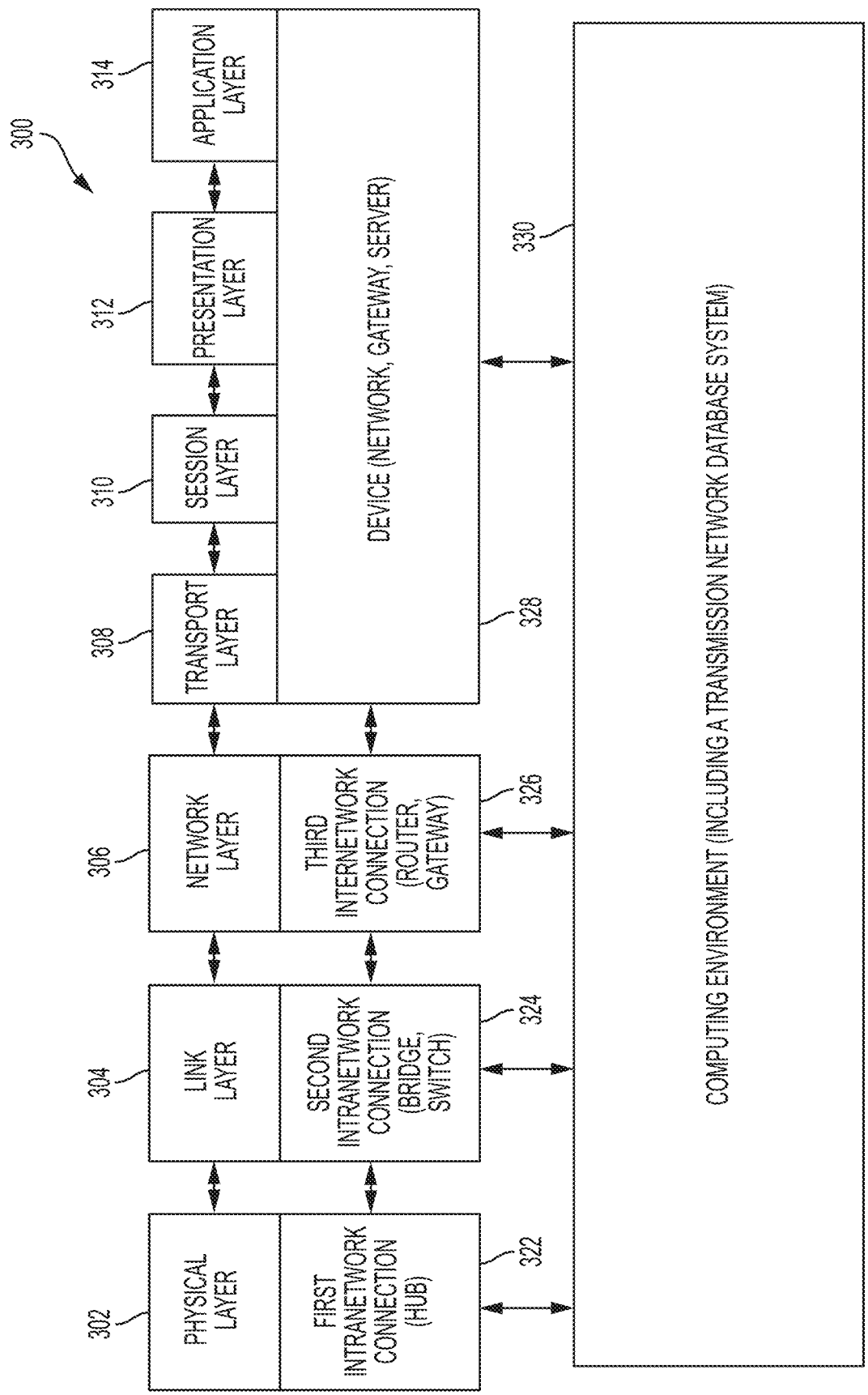
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for handling bulk requests and ad-hoc requests, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for handling bulk requests and ad-hoc requests.

Figure 4:
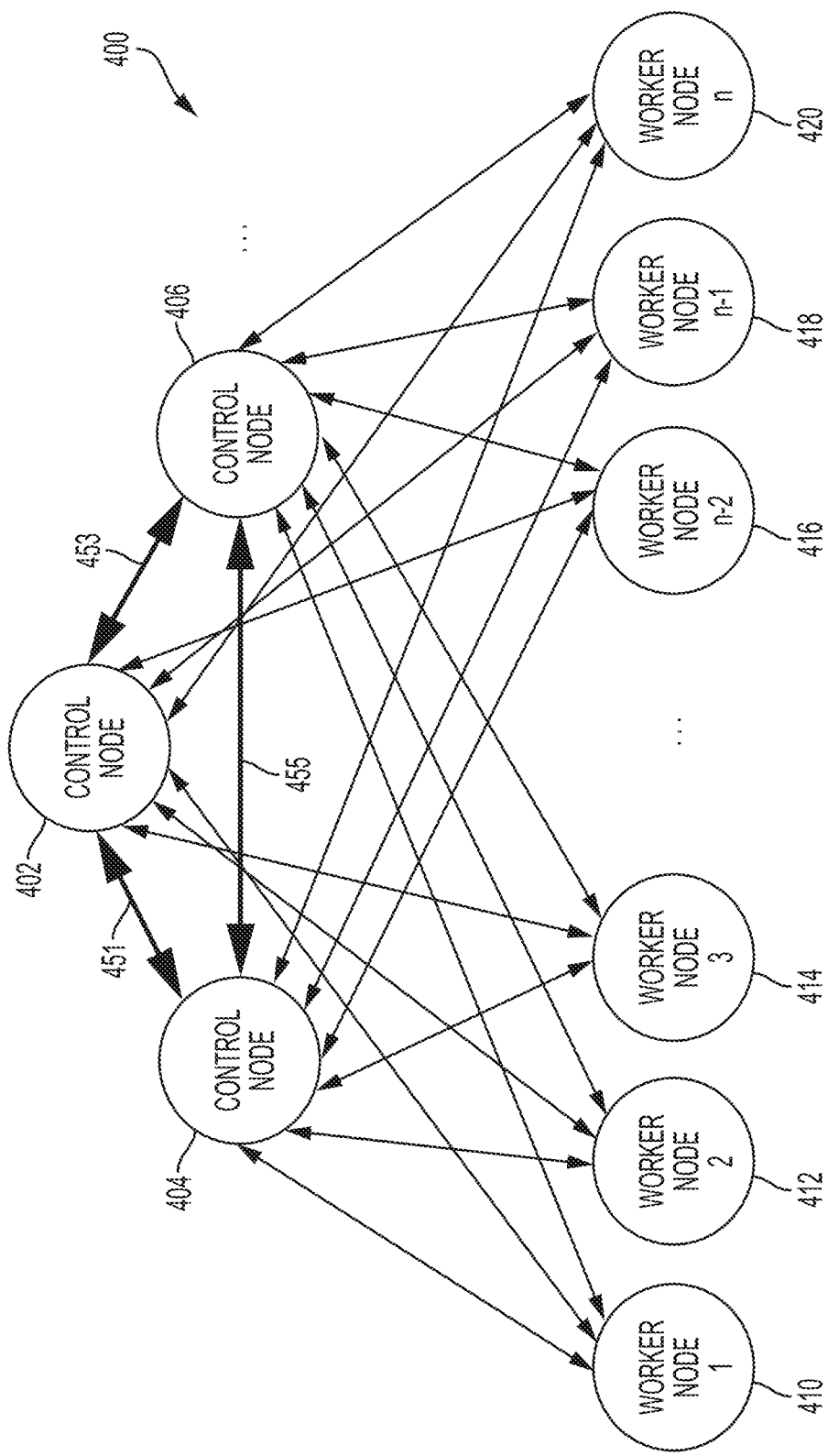
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to handling bulk requests and ad-hoc requests. The project may include the data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for handling bulk requests and ad-hoc requests can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may determine a bulk-parameter value using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to determine how to handle bulk requests and ad-hoc requests, such as which parameter values to assign to bulk requests and ad-hoc requests.

Figure 5:
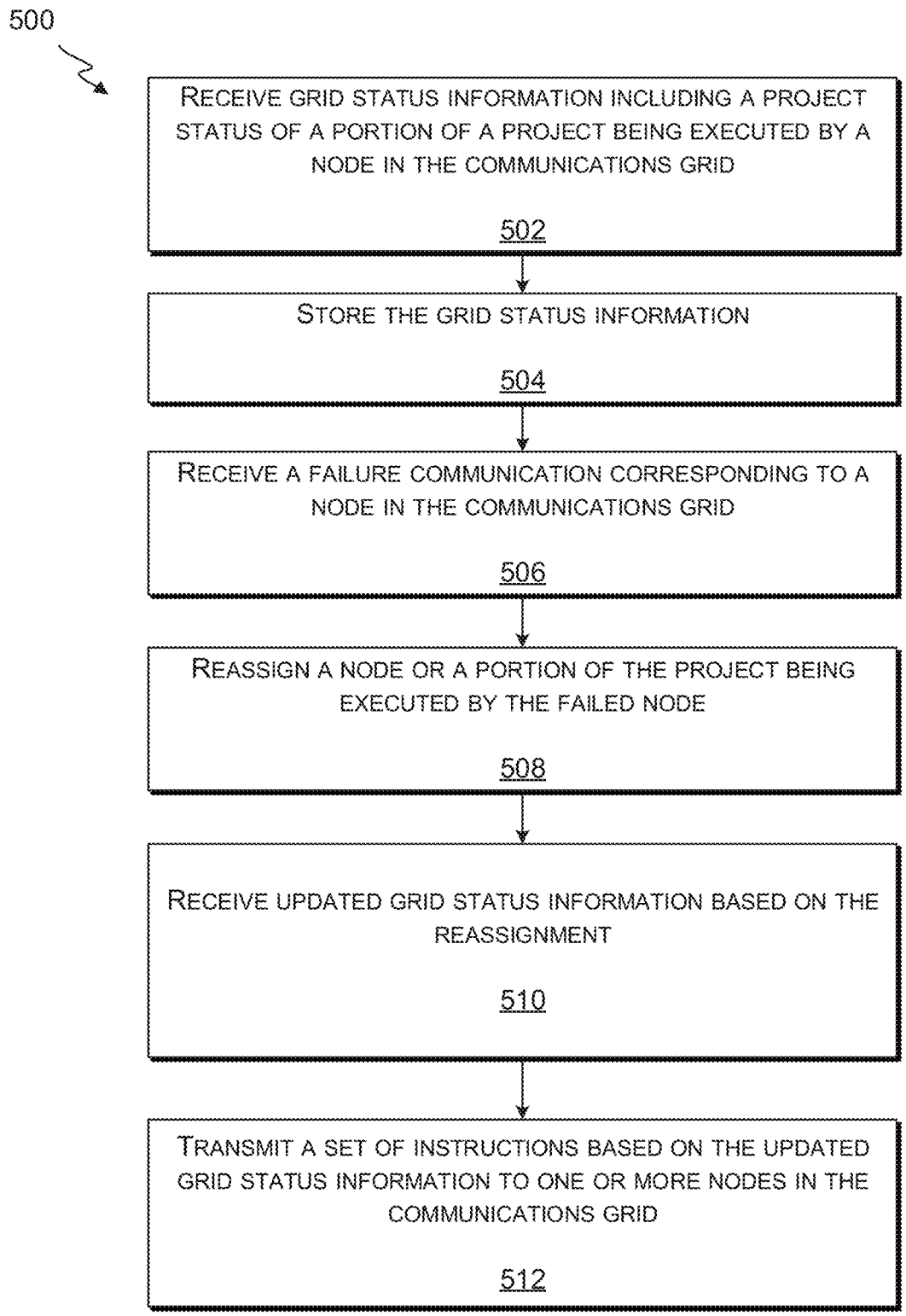
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
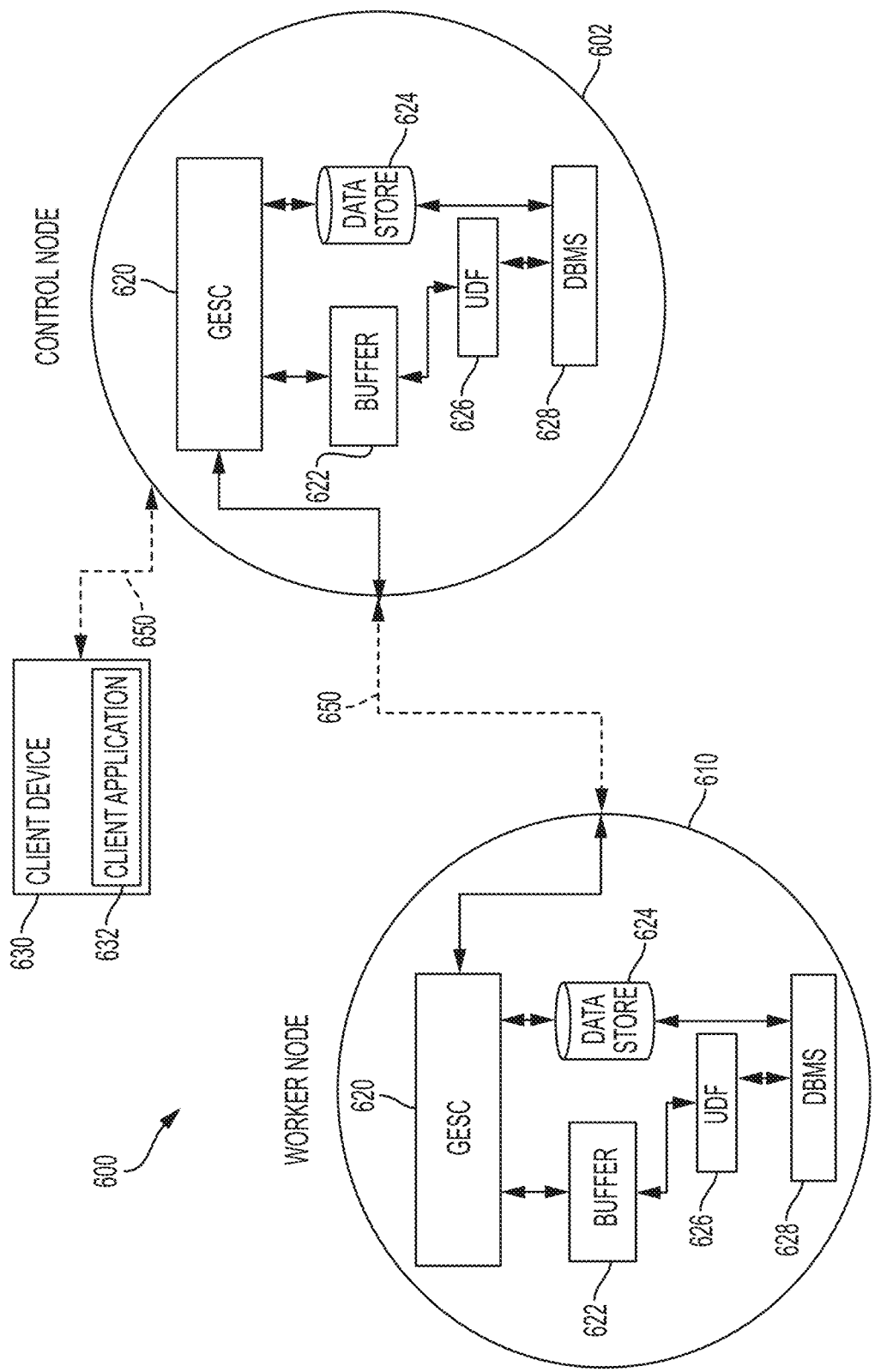
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
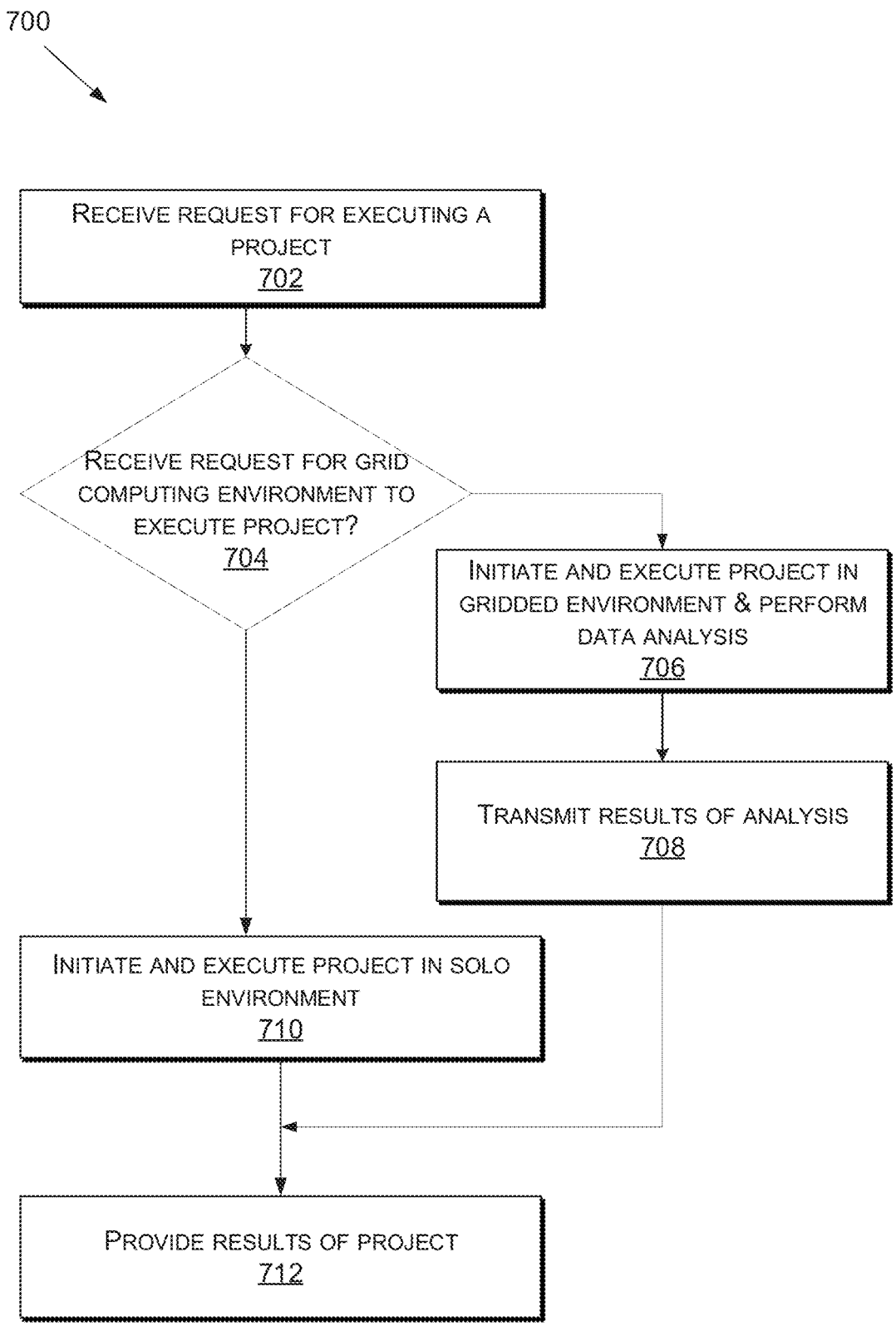
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
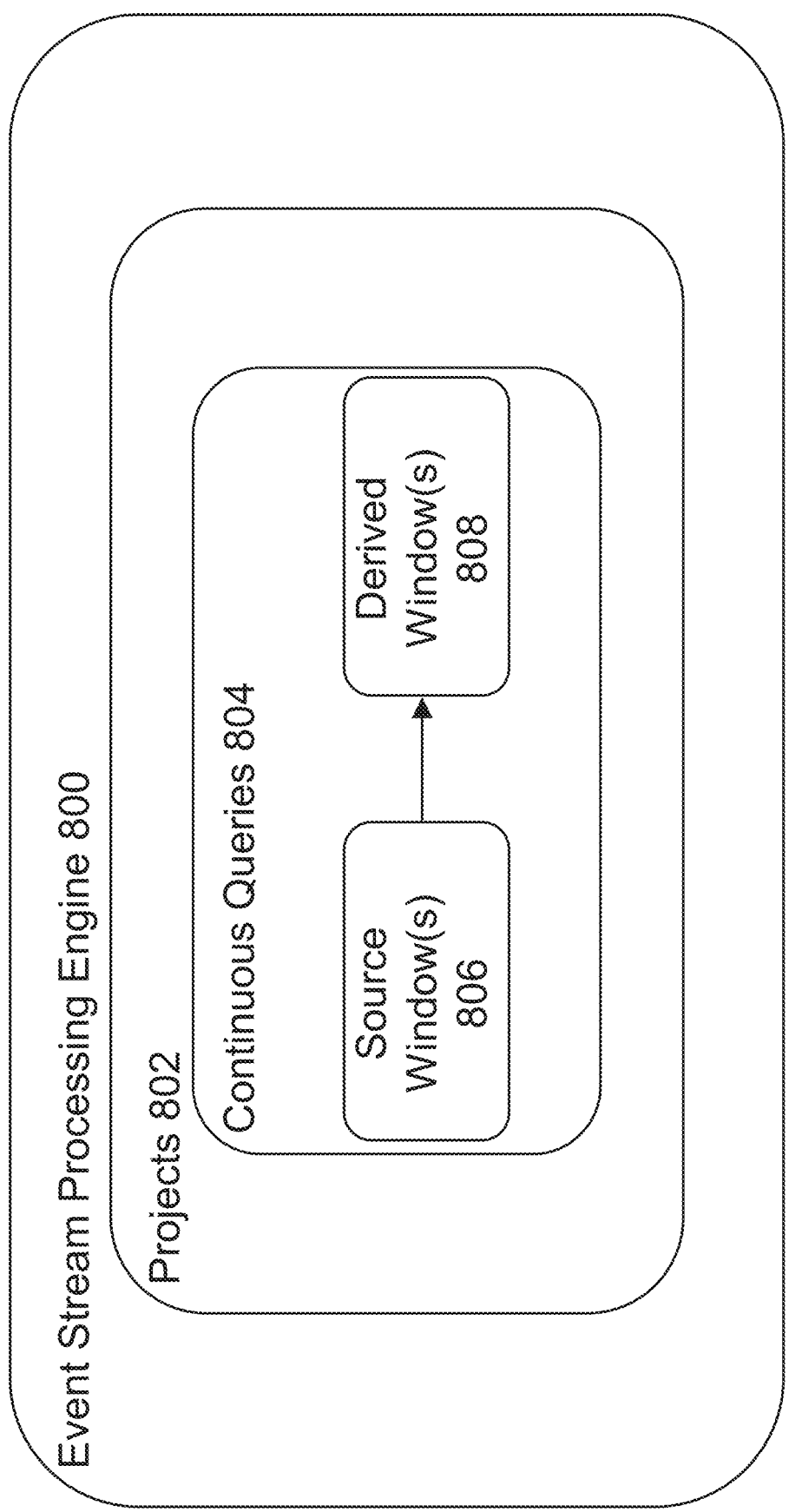
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
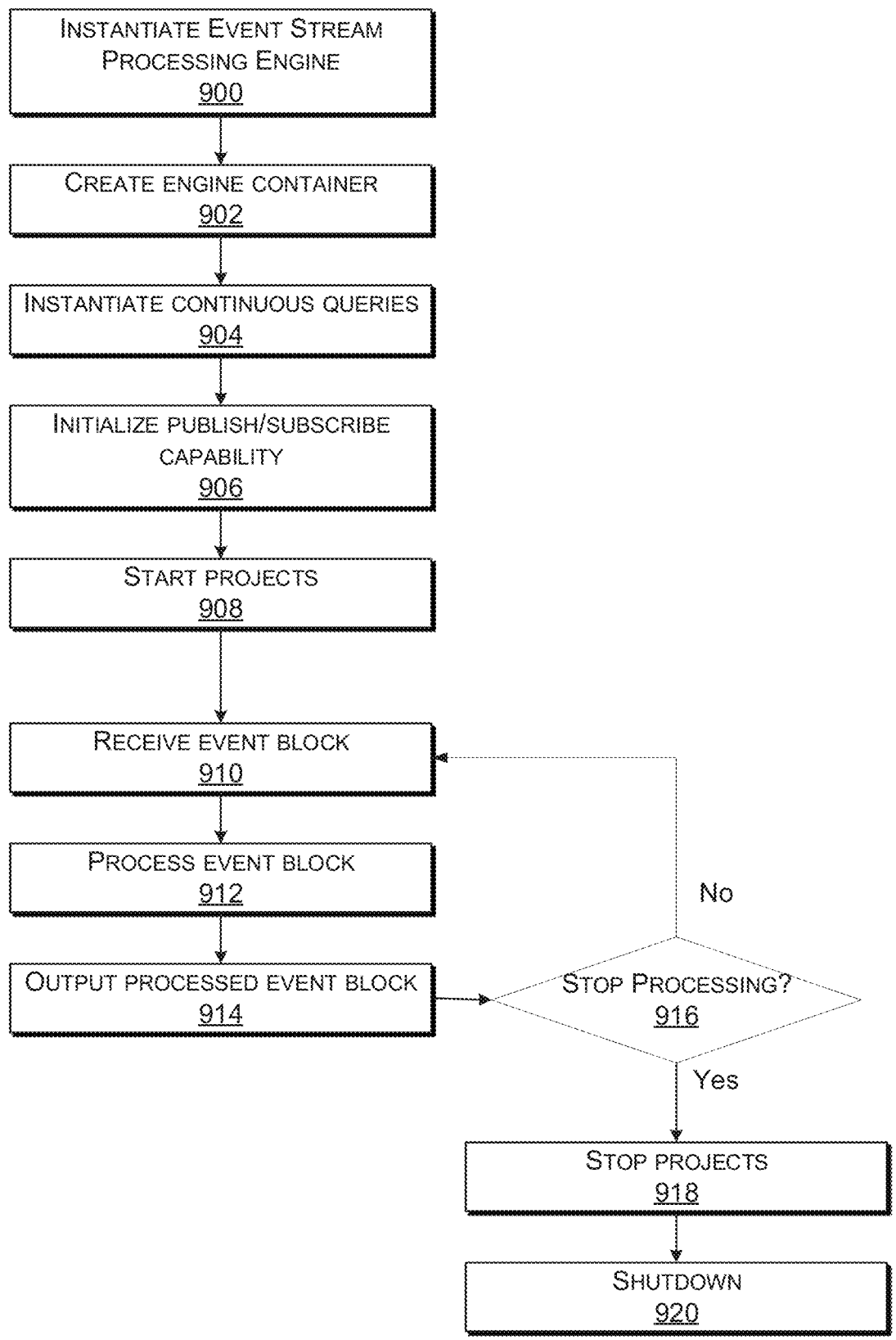
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
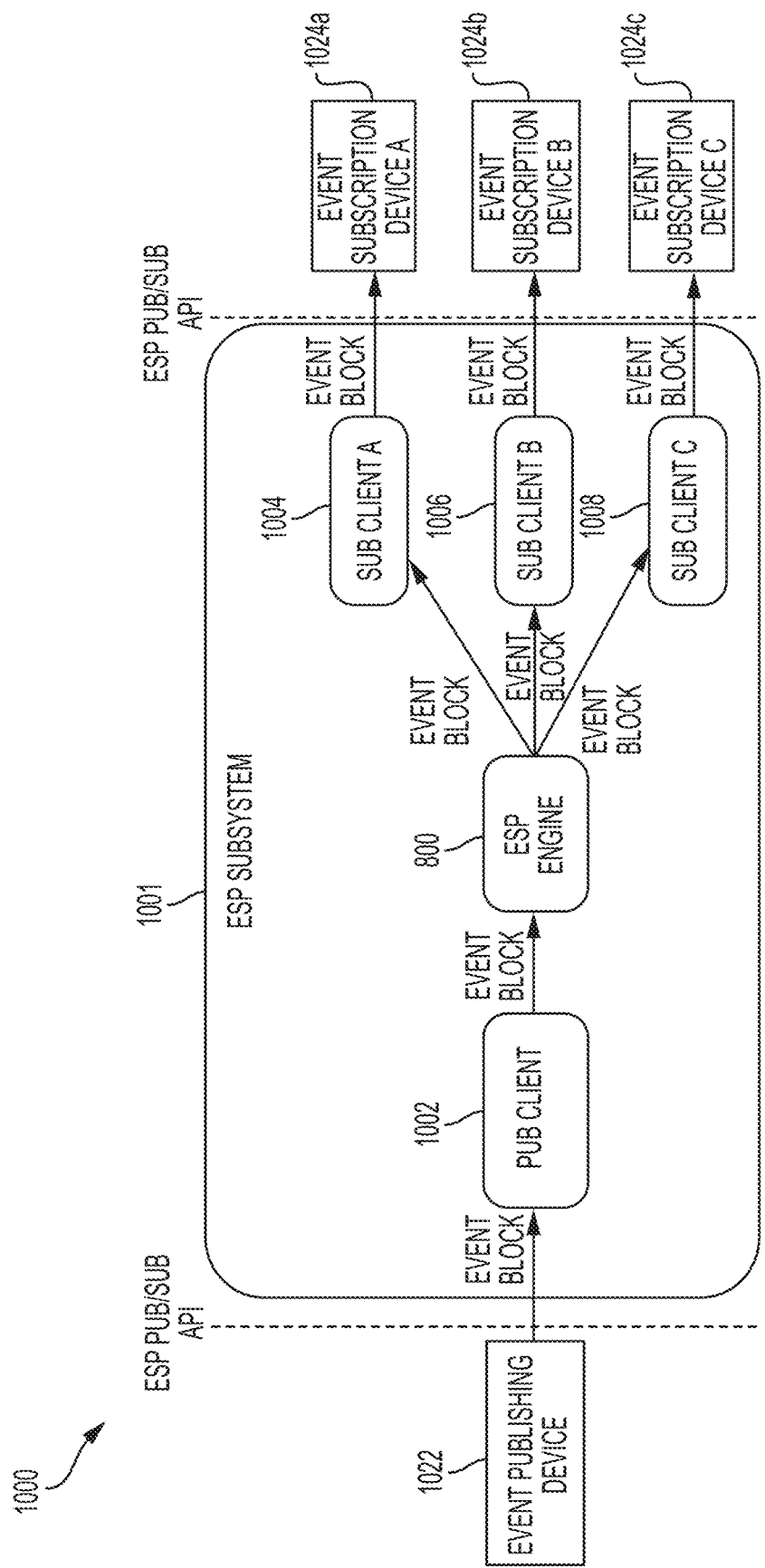
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
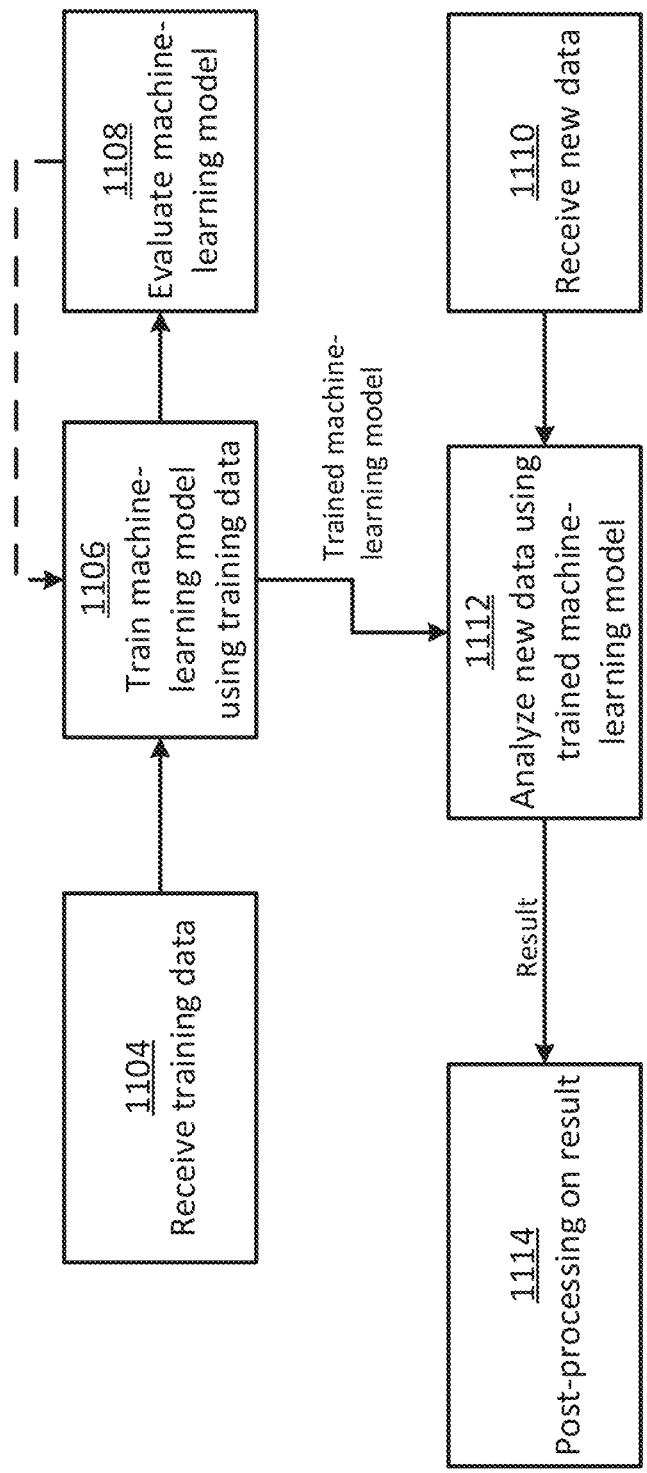
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and using machine-learning models can include SAS Enterprise Miner (e.g., with the SAS Text Miner add-on), SAS Rapid Predictive Modeler, SAS Model Manager, SAS Cloud Analytic Services (CAS), and SAS Viya (e.g., including Visual Text Analytics and Visual Analytics), all of which are by SAS Institute Inc.® of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
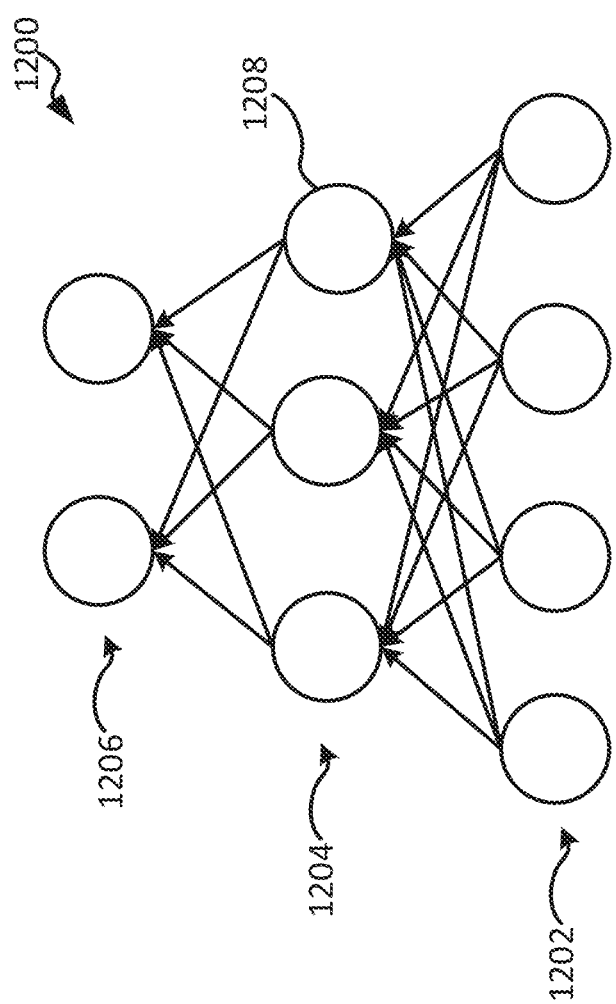
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation.

Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
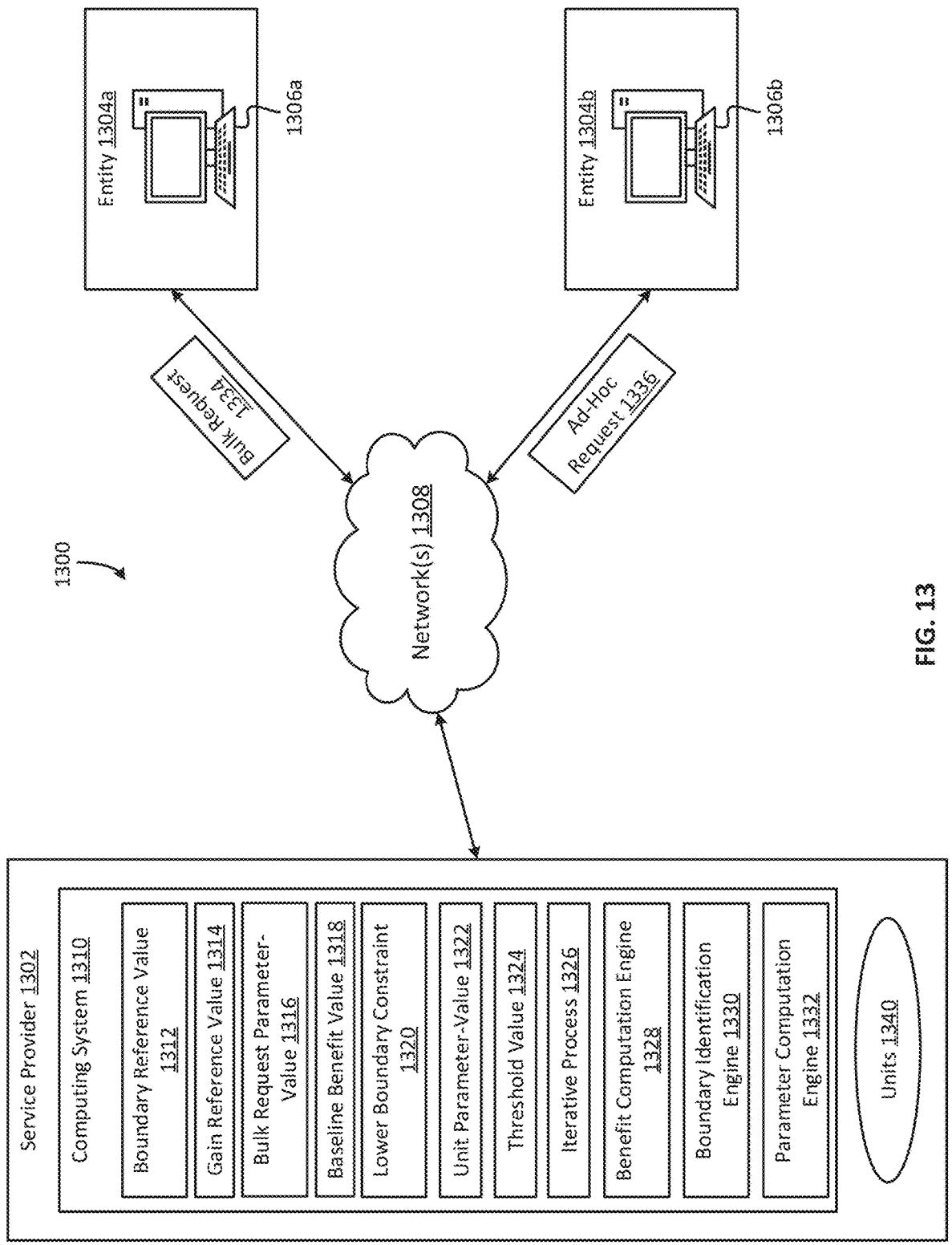
FIG. 13 shows a block diagram of an example of a system for handling bulk requests and ad-hoc requests according to some aspects of the present disclosure.

FIG. 13 shows a block diagram of an example of a system 1300 for handling bulk requests and ad-hoc requests according to some aspects of the present disclosure. The system 1300 includes a service provider 1302, such as a cloud computing provider or hotel. The service provider 1302 can offer products or services as units 1340 to one or more entities 1304a-b. The entities 1304a-b can have computing devices 1306a-b operable to submit requests for units 1340 to the service provider 1302. Examples of the computing device 1306a-b can include desktop computers, laptop computers, tablets, and mobile phones. The computing devices 1306a-b can transmit the requests to the service provider's computing system 1310 via one or more networks 1308, such as a local area network or the Internet. The service provider's computing system 1310 may include one or more computing devices, such as processors, servers, etc., capable of receiving and handling such requests.

In some examples, an entity 1304a can submit a bulk request 1334 to the computing system 1310 of the service provider 1302. The bulk request 1334 can be for reserving a group of units 1340 during a selected timeframe, such as from Dec. 21, 2022 to Dec. 25, 2022. The units 1340 may be, for example, virtual machines or instances of containerized applications. The service provider 1302 can receive the bulk request 1334 and assign a value to a parameter associated with the bulk request 1334. This can be referred to as a bulk request parameter-value 1316. Examples of the parameter can include a quality of service (QoS) parameter, a latency parameter, a cost parameter, etc. The value may be negotiated by the entity 1304a with the service provider 1302. A desirable value may be settled upon as a reward for submitting the bulk request 1334.

In some cases, the system 1300 may use the bulk request parameter-value 1316 to constrain a unit parameter-value, which is a parameter value assigned to the individual units 1340 during the selected timeframe. As one specific example in which the parameter is a latency parameter, the bulk request parameter-value 1316 can be a particular latency value that serves as a constraint on the latency values assigned to individual units during the selected timeframe. For instance, the particular latency value assigned to the bulk request 1334 can serve as a minimum latency value for the individual units during the selected timeframe. This may result from the service provider 1302 guaranteeing entity 1304a that the latency values assigned to the individual units will be no less than the bulk request parameter-value 1316.

In some situations, using the bulk request parameter-value 1316 to constrain the unit parameter-value can be detrimental. For example, this may lead to fewer entities issuing requests for units 1340 during the selected timeframe. Fewer entities issuing requests may lead to underutilization of the units 1340 during the selected timeframe, among other negative consequences. It may therefore be desirable in some situations to adjust the bulk request parameter-value 1316 to achieve a better result. To do so, the computing system 1310 can execute software configured to assist the service provider 1302 in determining whether, and how much, to adjust the bulk request parameter-value 1316. The software can execute the process shown in FIG. 14, which is further described below.

Figure 14:
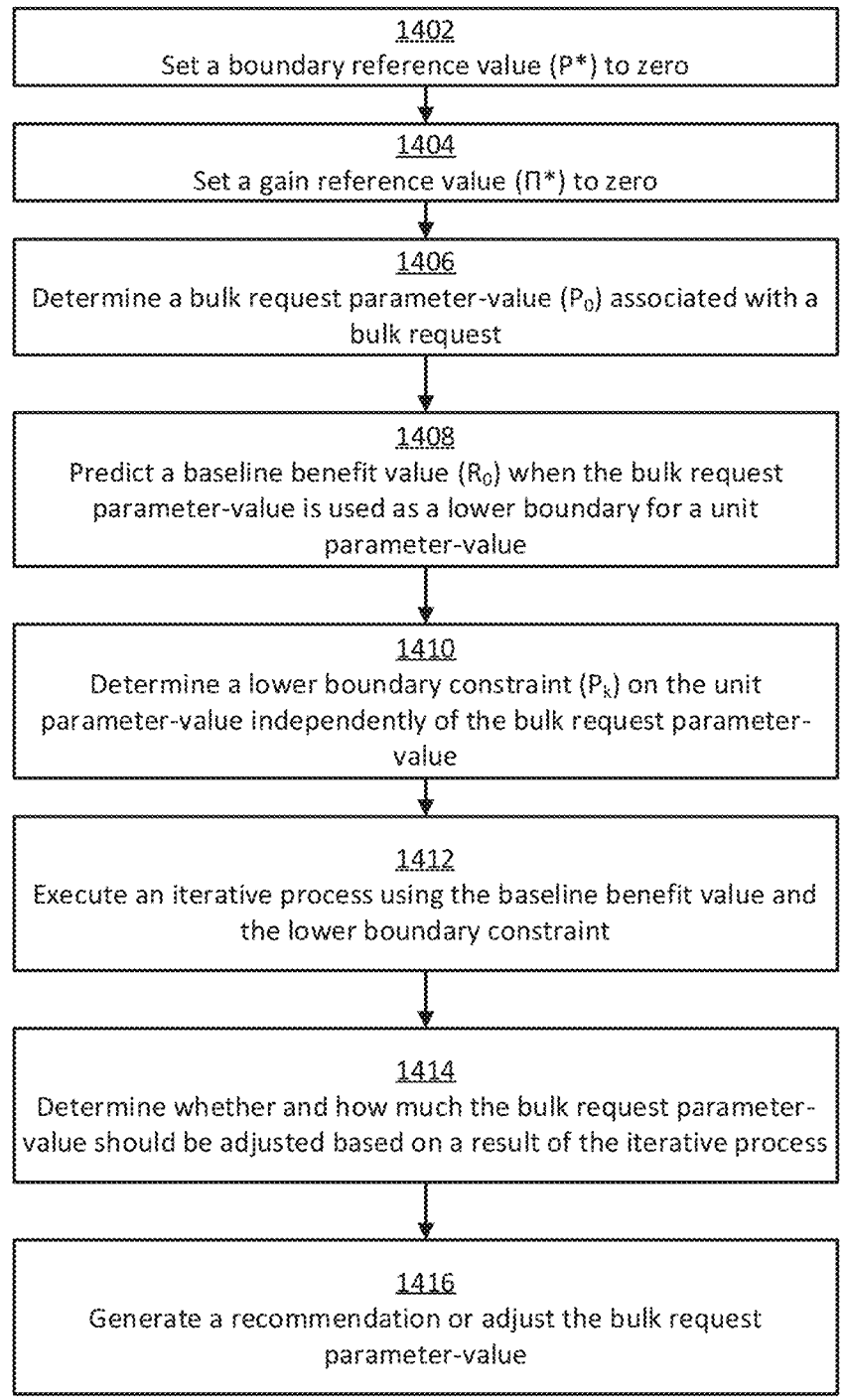
FIG. 14 shows a flow chart of an example of a process for adjusting a bulk request parameter-value according to some aspects of the present disclosure.

Referring now to FIG. 14, shown is a flow chart of an example of a process for adjusting a bulk request parameter-value according to some aspects of the present disclosure. Other examples may include more operations, fewer operations, different operations, or a different order of operations than is shown in FIG. 14. The operations for FIG. 14 are described below with reference to the components of FIG. 13 described above.

In general, blocks 1402-1410 can be conceptualized as an initialization process for setting up the variable values used in the iterative process of block 1412. The iterative process of block 1412 is described in greater detail later on with respect to subsequent figures.

Referring now to block 1402, the computing system 1310 of the service provider 1302 sets a boundary reference value 1312 to zero. The boundary reference value 1312 is a variable value stored in memory for use in the iterative process of block 1412 as a point of comparison. The boundary reference value 1312 is designated as $P^*$ herein. Although in this example the boundary reference value 1312 is set to zero, in other examples the processor may set the boundary reference value 1312 to a default value other than zero.

In block 1404, the computing system 1310 sets a gain reference value 1314 to zero. The gain reference value 1314 is a variable value stored in memory for use in the iterative process of block 1412 as a point of comparison. The gain reference value 1314 is designated as $\Pi^*$ herein. Although in this example the gain reference value 1314 is set to zero, in other examples the processor may set the gain reference value 1314 to a default value other than zero.

In block 1406, the computing system 1310 determines a bulk request parameter-value 1316 associated with a bulk request 1334. The bulk request 1334 is a request to access a group of units 1340 during a selected timeframe, which may for example span one day or multiple days. The bulk request parameter-value 1316 is a value for a particular parameter (PAR), where the value for the parameter is assigned to the bulk request 1334. The bulk request parameter-value 1316 is designated as $P_0$ herein.

Upon receiving the bulk request 1334 from an entity 1304a, a service provider 1302 may assign the bulk request parameter-value 1316 to the bulk request 1334. This value may be negotiated by the entity 1304a with the service provider 1302 or prefixed by the service provider 1302.

In block 1408, the computing system 1310 predicts a baseline benefit value 1318. The baseline benefit value 1318 can quantify an amount of benefit to the service provider 1302 in the scenario in which the bulk request parameter-value 1316 is used to constrain a unit parameter-value 1322. The unit parameter-value 1322 can be another value for the particular parameter (PAR) assigned to an individual unit during the selected timeframe. An example of the baseline benefit value may be a baseline profit amount. The baseline benefit value 1318 is designated as $R_0$ herein.

To generate this prediction, the computing system 1310 can execute a benefit computation engine 1328. The benefit computation engine 1328 is software that may include one or more models (e.g., machine-leaning models) configured to receive a unit-parameter value as input and provide a corresponding benefit value as output. To determine the baseline benefit value, the computing system 1310 can provide the bulk request parameter-value 1316 as the input to the benefit computation engine 1328. This targets the situation in which the unit-parameter value is the same as the bulk request parameter-value 1316.

In some examples, the benefit computation engine 1328 can include one or more algorithms (e.g., model) for predicting a benefit value based any number and combination of factors. Examples of these factors can include details of one or more ad-hoc requests, details of one or more bulk requests, an amount of available units in the system, one or more constraints on the unit parameter-value, or any combination of these. As one example in the context of a cloud computing environment, the benefit computation engine 1328 can compute an aggregate gain value given a list of ad-hoc requests submitted to the cloud computing environment and their associated unit parameter-values, a list of bulk requests submitted to the cloud computing environment and their associated bulk request parameter-values, and the availability of computing resources in the cloud computing environment.

In block 1410, the computing system 1310 determines a lower boundary constraint 1320 on the unit parameter-value 1322. The lower boundary constraint 1320 can be a minimum value for the unit parameter-value 1322, where the minimum value is determined independently of the bulk request parameter-value 1316. In other words, the computing system 1310 can determine the lower boundary constraint 1320 based on factors other than the bulk request parameter-value 1316. The lower boundary constraint 1320 is designated as $P_k$ herein.

To determine the lower boundary constraint 1320, the computing system 1310 can execute a boundary identification engine 1330. The boundary identification engine 1330 is software that may include one or more models configured to receive one or more input values and provide the lower boundary constraint 1320 as output.

In some examples, the boundary identification engine 1330 can accept a list of bulk requests and their corresponding bulk request parameter-values as input. The boundary identification engine 1330 can may also accept one or more constraints (e.g., system-wide constraints) as input. Based on these inputs, the boundary identification engine 1330 can identify the lower boundary constraint. The lower boundary constraint can be determined by removing the target bulk request 1334 and its corresponding bulk request parameter-value 1316 ($P_0$) from the list. More specifically, there may be multiple bulk requests submitted to the computing system 1310, one of which may be the target bulk request 1334. Each of the bulk requests may have a corresponding bulk request parameter-value. The boundary identification engine 1330 can receive those bulk request parameter-values along with one or more user-designated constraints as input. Based on these inputs, the boundary identification engine 1330 can determine the lower boundary constraint by excluding the target bulk request 1334 and its corresponding bulk request parameter-value 1316 from its computations. In this way, the boundary identification engine 1330 can determine what the lower boundary constraint would be if the target bulk request 1334 was not a factor. That is, the boundary identification engine 1330 can determine the lower boundary constraint independently of the target bulk request 1334 and based on a remainder of the bulk requests.

In block 1412, the computing system 1310 executes an iterative process using the baseline benefit value 1318 and the lower boundary constraint 1320. This iterative process 1326 is described in greater detail later on with respect to FIG. 15. But generally, the iterative process can involve repeatedly updating the gain reference value 1314 and boundary reference value 1312 if certain conditions are satisfied, until final values for the gain reference value 1314 and the boundary reference value 1312 are obtained.

In block 1414, the computing system 1310 determines whether and how much the bulk request parameter-value 1316 should be adjusted. For example, the computing system 1310 can determine whether the gain reference value 1314 is greater than zero following the iterative process 1326. If not, it may mean that the bulk request parameter-value 1316 should not be adjusted. Otherwise, it may mean that the bulk request parameter-value 1316 should be adjusted. In some examples, the bulk request parameter-value 1316 may be adjusted to be equivalent to the boundary reference value 1312 stored in memory following the iterative process 1326.

In block 1416, the computing system 1310 generates a recommendation or automatically adjusts the bulk request parameter-value 1316. For example, the computing system 1310 can generate a graphical user interface through which the user can select the bulk request 1334 or input information about the bulk request 1334. The user may then select a graphical object, such as a button, to initiate the iterative process 1326. After completing the iterative process 1326, the computing system 1310 can update the graphical user interface to include a graphical recommendation. The recommendation may indicate that the user should modify the bulk request parameter-value 1316, or not modify the bulk request parameter-value 1316, depending on the results of the iterative process 1326.

Figure 15:
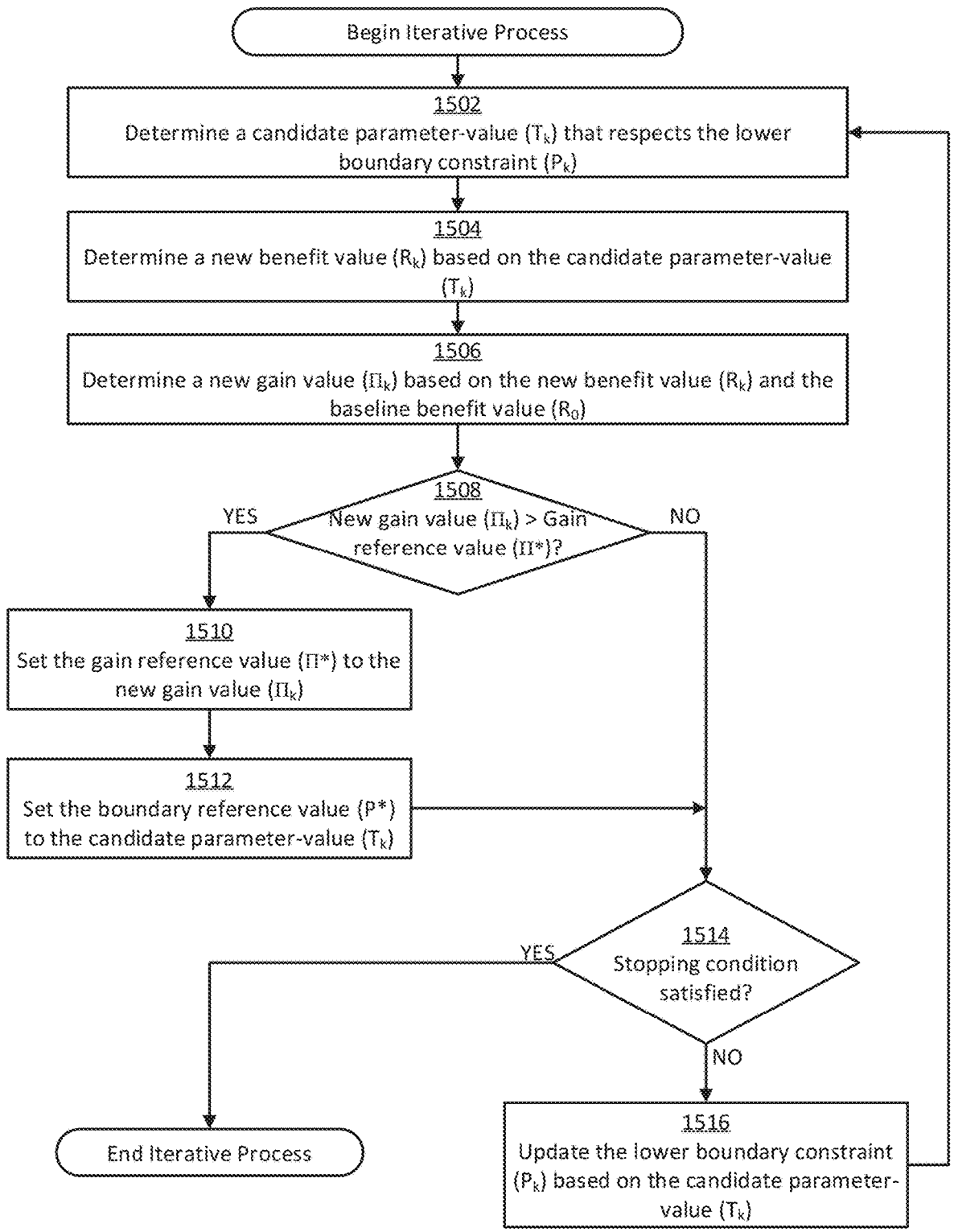
FIG. 15 shows a flow chart of an example of an iterative process according to some aspects of the present disclosure.

FIG. 15 is a flow chart of an example of the iterative process 1326 according to some aspects of the present disclosure. Other examples may include more operations, fewer operations, different operations, or a different order of operations than is shown in FIG. 15. The operations for FIG. 15 are described below with reference to the components of FIGS. 13-14 described above.

In block 1502, the computing system 1310 determines a candidate parameter-value that respects the lower boundary constraint 1320. The candidate parameter-value is selected by computing system 1310 for evaluation during the current iteration of the iterative process 1326. The candidate parameter-value is a potential value for the particular parameter (PAR) described above with respect to FIG. 14, where the potential value may be assigned to the individual units during the selected timeframe. Generally, the candidate parameter-value selected during each iteration is a new value relative to previous iterations of the iterative process 1326, in the sense that it has not been previously evaluated during prior iterations of the iterative process 1326. The candidate value is designated as $T_k$ herein, where k can be the current iteration number in the iterative process.

To determine the candidate parameter-value, the computing system 130 can execute a parameter computation engine 1332. The parameter computation engine 1332 is software that may include one or more models configured to receive the lower boundary constraint 1320 as an input and provide the candidate parameter-value as output.

In some examples, the parameter computation engine 1332 can include one or more algorithms for predicting a unit parameter-value based any number and combination of factors. Examples of these factors can include details of one or more ad-hoc requests, details of one or more bulk requests, an amount of available units in the system, one or more constraints on the unit parameter-value, or any combination of these. As one example in the context of a cloud computing environment, the parameter computation engine 1332 can compute a unit parameter-value given a list of ad-hoc requests submitted to the cloud computing environment and their associated unit parameter-values, a list of bulk requests submitted to the cloud computing environment and their associated bulk request parameter-values, the availability of computing resources in the cloud computing environment, and one or more constraints on the unit parameter-value provided by a user.

In block 1504, the computing system 1310 determines a new benefit value based on the candidate parameter-value ($T_k$). The new benefit value can quantify an amount of benefit to the service provider 1302 in the scenario in which the lower boundary constraint 1320 ($P_k$) is used, instead of the bulk request parameter-value 1316, to constrain the unit parameter-value during the selected timeframe. The new benefit value is designated as $R_k$ herein.

To make this determination, in some examples the computing system 1310 can execute the benefit computation engine 1328. As noted above, the benefit computation engine 1328 is software that can receive a unit parameter-value as input and provide a benefit value as output. To determine the new benefit value, the computing system 1310 can provide the new unit parameter-value as input to the benefit computation engine 1328.

In block 1506, the computing system 1310 determines a new gain value based on the new benefit value and the baseline benefit value 1318. The new gain value is designated as $\Pi_k$ herein. In some examples, the computing system 130 can determine the new gain value using the following equation:

$$\Pi_k = (R_k - R_0) - G(P_0 - P_k)$$

where $R_k$ is new benefit value, $R_0$ is the baseline benefit value 1318, $P_0$ is the bulk request parameter-value 1316, $P_k$ is lower boundary constraint 1320, and G is a total number of units associated with the bulk request 1334. Other examples may compute the new gain value using more, fewer, or different factors.

In block 1508, the computing system 1310 determines whether the new gain value ($\Pi_k$) is greater than the gain reference value 1314 (Π*). If so, the process continues to block 1510. If not, the process continues to block 1514.

In block 1510, the computing system 1310 sets the gain reference value to the new gain value. This involves updating the gain reference value in memory to the new gain value.

In block 1512, the computing system 1310 sets the boundary reference value 1312 (P*) to the candidate parameter-value ($T_k$). This involves updating the boundary reference value in memory to the candidate parameter-value.

In block 1514, the computing system 1310 determines whether a stopping condition is satisfied. One example of the stopping condition can include the new value being greater than or equal to a threshold value 1324. An example of the threshold value 1324 can be ($P_0 - \varepsilon_1$), where $\varepsilon_1$ is a step value that may be predefined. If the stopping condition is satisfied, the iterative process can end. Otherwise, the process can proceed to block 1516, where the computing system 1310 updates the lower boundary constraint 1320 based on the candidate parameter-value ($T_k$). For example, the computing system 1310 can update the lower boundary constraint 1320 to be equal to the candidate parameter-value plus $\varepsilon_2$, where $\varepsilon_2$ is a step value that may be predefined. It will be appreciated that $\varepsilon_2$ may be the same as or different from $\varepsilon_1$. After updating the lower boundary constraint 1320, the process may then return back to block 1502 and iterate.

In some examples, the system can include a graphical user interface to assist a user in determining whether, and how much, to adjust a bulk request parameter-value. One example of the graphical user interface 1600 is shown in FIG. 16. As shown, the graphical user interface 1600 can include various graphical objects (e.g., objects 1604a-e, 1606, 1610, and 1612) for inputting or outputting information. Examples of such graphical objects can include dropdown menus, text boxes, radio buttons, check boxes, tables, buttons, etc.

In particular, the graphical user interface 1600 can include objects 1604a-e. Object 1604a can allow a user to select which type of evaluation to perform. Here, the user has selected that they would like to evaluate an existing bulk request, but another option may be to evaluate a new bulk request. Object 1604b can allow the user to search for bulk requests by date. Object 1604c can allow the user to input the name of a bulk request to be evaluated. Object 1604d can allow the user to input, or can output, a time duration associated with a selected bulk request. One example of the time duration can be five days, for instance if the bulk request is a reservation to use a group of virtual machines for a five-day timespan. Object 1604e can allow the user to input, or can output, a starting date associated with the bulk request. The starting date can be the date at which the time duration begins.

The graphical user interface 1600 can also include a table 1606 providing information about the timeframe associated with the bulk request. In the example shown in FIG. 16, the bulk request has a start date of Dec. 11, 2022 and spans for five days, so the table 1606 spans from Dec. 11, 2022 to Dec. 15, 2022. Each row in the table 1606 corresponds to a different date and can provide information about the units with respect to that date.

In the table 1606, the column labeled "Current Value" indicates the bulk request parameter-value as currently set for a given date. The bulk request parameter-values shown in the "Current Value" column may constrain the unit parameter-values associated with the dates shown in the table 1606. In the last three columns of the table 1606, the user can input alternative/optional values for the bulk request parameter-value on each date. Of course, in other examples that table 1606 may include more or fewer columns to allow the user to input more or fewer optional values, respectively. These inputs may be received in text boxes 1608, which are incorporated into the table 1606.

Once the user has input the optional values, the user can press a button 1610 for causing the computing system 1310 to estimate gain values associated with the alternative values. The estimated gains may then be output in a results portion 1612. As shown in FIG. 16, the results portion 1612 can provide an expected gain increase or decrease corresponding to each of the optional values input by the user. An indicator 1614 can indicate which of the three optional values yields the best result (e.g., the highest gain). If the indicator 1614 indicates that one of the optional values yields more gain than the current values, it may suggest to the user that the bulk request parameter-value should be adjusted, for example to the optional value that yielded the gain improvement. To make this more explicit, in some examples the graphical user interface 1600 may output a recommendation to adjust (e.g., lower) the bulk request parameter-value to the optional value that yielded the gain improvement. In this way, the user can manually input optional values for the bulk request parameter-values on various dates and receive automated assessments of those optional values as outputs in the graphical user interface 1600.

Although the graphical user interface 1600 includes a certain number and arrangement of graphical elements, this is for illustrative purposes and not intended to be limiting. Other examples may include more graphical elements, fewer graphical elements, different graphical elements, or a different arrangement of the graphical elements shown in FIG. 16.

Figure 17:
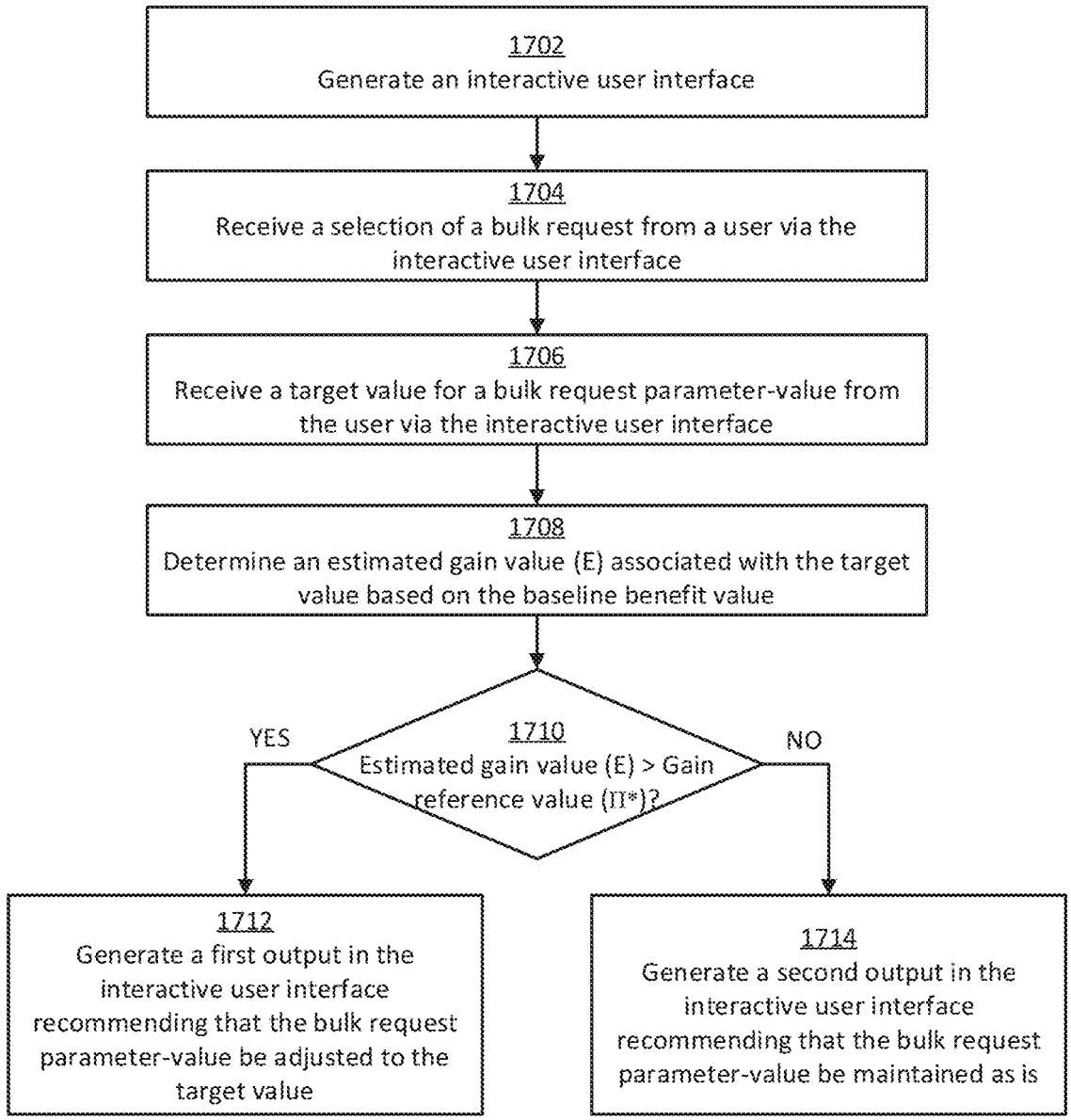
FIG. 17 shows a flow chart of an example of a process for facilitating the creation and usage of an interactive user interface according to some aspects of the present disclosure.

FIG. 17 is a flow chart of an example of a process for facilitating the creation and usage of an interactive user interface, such as the GUI 1600 of FIG. 16, according to some aspects of the present disclosure. Other examples may include more operations, fewer operations, different operations, or a different order of operations than is shown in FIG. 17. The operations for FIG. 17 are described below with reference to the components of FIGS. 13 and 16 described above.

In block 1702, a computing system 1310 generates an interactive user interface. The interactive user interface can be a graphical user interface for display on a display device. A system operator or other user may be able to interact with the user interface to determine whether, and how much, to adjust a bulk request parameter-value.

In block 1704, the computing system 1310 receives a selection of a bulk request as input from a user a via the interactive user interface. For example, the user may select a desired bulk request from a dropdown list of bulk requests or input a name of the desired bulk request into a textbox.

In block 1706, the computing system 1310 receives a target value for a bulk request parameter-value as input from the user via the interactive user interface. For example, the user may input the target value into a text box, similar to how the optional value is input into the text box 1608 of FIG. 16.

In block 1708, the computing system 1310 determines an estimated gain value associated with the target value based on a baseline benefit value 1318. The baseline benefit value 1318 can be determined with respect to the selected bulk request by implementing the operations of block 1408. In some examples, the estimated gain can be determined by implementing the operations of blocks 1504-1506 of FIG.

15, with the target value serving as the candidate parameter-value. The estimated gain value is designated as E herein.

In block 1710, the computing system 1310 determines whether the estimated gain value is greater than the gain reference value 1314, which may be zero. If so, the process can proceed to block 1712. Otherwise, the process can proceed to block 1714.

In block 1712, the computing system 1310 generates a first output in the interactive user interface recommending that the bulk request parameter-value 1316 associated with the selected bulk request be adjusted. The first output may be a graphical output, for example a popup notification or icon.

In block 1714, the computing system 1310 generates a second output in the interactive user interface recommending that the bulk request parameter-value 1316 associated with the selected bulk request be maintained as is. The second output may be a graphical output, for example a popup notification or icon.

As described above, some examples of the present disclosure may be applicable to computer networks and other contexts in which bulk requestors are provided with guarantees that impact ad-hoc requests. Another example of an applicable context can be supply chain management (SCM), in which entities can submit bulk requests and ad-hoc requests for items, of which there may be a fixed and limited supply. A provider (e.g., manufacturer) of the items may have relationships with the bulk requestors and provide guarantees thereto of the types described above. Those guarantees may constrain a unit parameter-value (e.g., a price) associated with the items when they are requested on an ad-hoc basis. Some examples of the present disclosure can help the item provider determine whether and how much to adjust a bulk-request parameter value associated with a bulk request for the items, so as to achieve a desired result.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memory devices including program code that is executable by the one or more processors for causing the one or more processors to:
set a boundary reference value to a first default value in memory;
set a gain reference value to a second default value in the memory;
determine a bulk request parameter-value assigned to a bulk request, wherein the bulk request is for reserving a group of units during a selected timeframe, and wherein the bulk request parameter-value is a value for a parameter assigned to the bulk request;
predict a baseline benefit value based on the bulk request parameter-value, the baseline benefit value being predicted by using the bulk request parameter-value as a lower boundary for a unit parameter-value, the unit parameter-value being another value for the parameter assigned to an individual unit during the selected timeframe;
determine a lower boundary constraint for the unit parameter-value independently of the bulk request parameter-value;
execute an iterative process including:
a) determining a candidate parameter-value for the parameter based on the lower boundary constraint;
b) determining a new gain value based on the candidate parameter-value and the baseline benefit value;
c) in response to determining that the new gain value is greater than the gain reference value:
setting the gain reference value to the new gain value; and
setting the boundary reference value to the lower boundary constraint;
d) in response to determining that the candidate parameter-value is less than a threshold value:
updating the lower boundary constraint based on the candidate parameter-value; and
returning to operation (a); and
e) in response to determining that the candidate parameter-value is greater than or equal to the threshold value:
exiting the iterative process;
subsequent to exiting the iterative process, determine whether the gain reference value is greater than zero; and
based on determining that the gain reference value is greater than zero, adjust the bulk request parameter-value to the boundary reference value.

2. The system of claim 1, wherein the one or more memory devices further include program code that is executable by the one or more processors for causing the one or more processors to, subsequent to exiting the iterative process:
determine whether the gain reference value is less than or equal to zero; and based on determining that the gain reference value is less than or equal to zero, generate an output recommending that the bulk request parameter-value be maintained.

3. The system of claim 1, wherein the threshold value is equal to the bulk request parameter-value minus a step value.

4. The system of claim 1, wherein the updating the lower boundary constraint based on the candidate parameter-value includes:
 updating the lower boundary constraint to be equivalent to the candidate parameter-value plus a step value.

5. The system of claim 1, wherein the one or more memory devices further include program code that is executable by the one or more processors for causing the one or more processors to, for each iteration of the iterative process:
 determine a new benefit value for a current iteration based on the candidate parameter-value for the current iteration;
 determine a first computed value by subtracting the baseline benefit value from the new benefit value;
 determine a second computed value by subtracting a current value of the lower boundary constraint for the current iteration from an initial value of the lower boundary constraint generated prior to initiating the iterative process;
 determine a third computed value by multiplying the second computed value by a number of units in the group of units; and
 determine the new gain value by subtracting the third computed value from the first computed value.

6. The system of claim 1, wherein the group of units are computer processors and the individual unit is an individual computer processor.

7. The system of claim 6, wherein the parameter is a bandwidth parameter, memory consumption parameter, processor consumption parameter, quality of service parameter, latency parameter, or a cost parameter.

8. The system of claim 1, wherein the group of units are physical rooms and the individual unit is an individual physical room.

9. The system of claim 8, wherein the parameter is a cost parameter.

10. The system of claim 1, wherein the one or more memory devices further include program code that is executable by the one or more processors for causing the one or more processors to:
 generate an interactive user interface including an interface component through which a user can input a target value for the bulk request parameter-value;
 receive the target value from the user via the interactive user interface;
 determine an estimated gain value based on the target value and the baseline benefit value;
 determine whether the estimated gain value is greater than the gain reference value;
 in response to determining that the estimated gain value is greater than the gain reference value, generate a first output in the interactive user interface recommending that the bulk request parameter-value be adjusted to the target value; and
 in response to determining that the estimated gain value is less than or equal to the gain reference value, generate a second output in the interactive user interface recommending that the bulk request parameter-value be maintained as is.

11. A method comprising:
 setting, by one or more processors, a boundary reference value to a first default value in memory;
 setting, by the one or more processors, a gain reference value to a second default value in the memory;
 determining, by the one or more processors, a bulk request parameter-value assigned to a bulk request, wherein the bulk request is for reserving a group of units during a selected timeframe, and wherein the bulk request parameter-value is a value for a parameter assigned to the bulk request;
 predicting, by the one or more processors, a baseline benefit value based on the bulk request parameter-value, wherein the baseline benefit value is predicted by using the bulk request parameter-value as a lower boundary for a unit parameter-value, the unit parameter-value being another value for the parameter assigned to an individual unit during the selected timeframe;
 determining, by the one or more processors, a lower boundary constraint for the unit parameter-value independently of the bulk request parameter-value;
 executing, by the one or more processors, an iterative process including:
  a) executing a parameter computation engine configured to determine a candidate parameter-value for the parameter based on the lower boundary constraint;
  b) determining a new gain value based on the candidate parameter-value and the baseline benefit value;
  c) in response to determining that the new gain value is greater than the gain reference value:
   setting the gain reference value to the new gain value; and
   setting the boundary reference value to the lower boundary constraint; and
  d) in response to determining that the candidate parameter-value is less than a threshold value:
   updating the lower boundary constraint based on the candidate parameter-value; and
   returning to operation (a);
 exiting the iterative process;
 subsequent to exiting the iterative process, determining, by the one or more processors, whether the gain reference value is greater than zero; and
 based on determining that the gain reference value is greater than zero, adjusting, by the one or more processors, the bulk request parameter-value to the boundary reference value.

12. The method of claim 11, further comprising:
 determine whether another gain reference value associated with another bulk request parameter-value is less than or equal to zero; and
 based on determining that the other gain reference value is less than or equal to zero, generate an output recommending that the other bulk request parameter-value be maintained.

13. The method of claim 11, wherein the threshold value is equal to the bulk request parameter-value minus a step value.

14. The method of claim 11, wherein the updating the lower boundary constraint based on the candidate parameter-value includes:
 updating the lower boundary constraint to be equivalent to the candidate parameter-value plus a step value.

15. The method of claim 11, further comprising, for each iteration of the iterative process:
   determining a new benefit value for a current iteration based on the candidate parameter-value for the current iteration;
   determining a first computed value by subtracting the baseline benefit value from the new benefit value;
   determining a second computed value by subtracting a current value of the lower boundary constraint for the current iteration from an initial value of the lower boundary constraint generated prior to initiating the iterative process;
   determining a third computed value by multiplying the second computed value by a number of units in the group of units; and
   determining the new gain value by subtracting the third computed value from the first computed value.

16. The method of claim 11, wherein the group of units are computer processors and the individual unit is an individual computer processor.

17. The method of claim 16, wherein the parameter is a bandwidth parameter, memory consumption parameter, processor consumption parameter, quality of service parameter, latency parameter, or a cost parameter.

18. The method of claim 11, wherein the group of units are physical rooms and the individual unit is an individual physical room.

19. The method of claim 18, wherein the parameter is a cost parameter.

20. The method of claim 11, further comprising:
   generating an interactive user interface including an interface component through which a user can input a target value for the bulk request parameter-value;
   receiving the target value from the user via the interactive user interface;
   determining an estimated gain value based on the target value and the baseline benefit value;
   determine whether the estimated gain value is greater than the gain reference value;
   in response to determining that the estimated gain value is greater than the gain reference value, generate a first output in the interactive user interface recommending that the bulk request parameter-value be adjusted to the target value; and
   in response to determining that the estimated gain value is less than or equal to the gain reference value, generate a second output in the interactive user interface recommending that the bulk request parameter-value be maintained as is.

21. A non-transitory computer-readable medium comprising program code that is executable by one or more processors for causing the one or more processors to:
   set a boundary reference value to a first default value in memory;
   set a gain reference value to a second default value in the memory;
   determine a bulk request parameter-value assigned to a bulk request, wherein the bulk request is for reserving a group of units during a selected timeframe, and wherein the bulk request parameter-value is a value for a parameter assigned to the bulk request;
   predict a baseline benefit value based on the bulk request parameter-value, the baseline benefit value being predicted by using the bulk request parameter-value as a lower boundary for a unit parameter-value, the unit parameter-value being another value for the parameter assigned to an individual unit during the selected timeframe;
   determine a lower boundary constraint for the unit parameter-value independently of the bulk request parameter-value;
   execute an iterative process including:
      a) executing a parameter computation engine configured to determine a candidate parameter-value for the parameter based on the lower boundary constraint;
      b) determining a new gain value based on the candidate parameter-value and the baseline benefit value;
      c) in response to determining that the new gain value is greater than the gain reference value:
         setting the gain reference value to the new gain value; and
         setting the boundary reference value to the lower boundary constraint;
      d) in response to determining that the candidate parameter-value is less than a threshold value:
         updating the lower boundary constraint based on the candidate parameter-value; and
         returning to operation (a); and
      e) in response to determining that the candidate parameter-value is greater than or equal to the threshold value:
         exiting the iterative process;
   subsequent to exiting the iterative process, determine whether the gain reference value is greater than zero; and
   based on determining that the gain reference value is greater than zero, adjust the bulk request parameter-value to the boundary reference value.

22. The non-transitory computer-readable medium of claim 21, further comprising program code that is executable by the one or more processors for causing the one or more processors to, subsequent to exiting the iterative process:
   determine whether the gain reference value is less than or equal to zero; and
   based on determining that the gain reference value is less than or equal to zero, generate an output recommending that the bulk request parameter-value be maintained.

23. The non-transitory computer-readable medium of claim 21, wherein the threshold value is equal to the bulk request parameter-value minus a step value.

24. The non-transitory computer-readable medium of claim 21, wherein the updating the lower boundary constraint based on the candidate parameter-value includes:
   updating the lower boundary constraint to be equivalent to the candidate parameter-value plus a step value.

25. The non-transitory computer-readable medium of claim 21, further comprising program code that is executable by the one or more processors for causing the one or more processors to, for each iteration of the iterative process:
   determine a new benefit value for a current iteration based on the candidate parameter-value for the current iteration;
   determine a first computed value by subtracting the baseline benefit value from the new benefit value;
   determine a second computed value by subtracting a current value of the lower boundary constraint for the current iteration from an initial value of the lower boundary constraint generated prior to initiating the iterative process;

determine a third computed value by multiplying the second computed value by a number of units in the group of units; and determine the new gain value by subtracting the third computed value from the first computed value.

26. The non-transitory computer-readable medium of claim 21, wherein the group of units are computer processors and the individual unit is an individual computer processor.

27. The non-transitory computer-readable medium of claim 26, wherein the parameter is a bandwidth parameter, memory consumption parameter, processor consumption parameter, quality of service parameter, latency parameter, or a cost parameter.

28. The non-transitory computer-readable medium of claim 21, wherein the group of units are physical rooms and the individual unit is an individual physical room.

29. The non-transitory computer-readable medium of claim 28, wherein the parameter is a cost parameter.

30. The non-transitory computer-readable medium of claim 21, further comprising program code that is executable by the one or more processors for causing the one or more processors to:

generate an interactive user interface including an interface component through which a user can input a target value for the bulk request parameter-value;

receive the target value from the user via the interactive user interface;

determine an estimated gain value based on the target value and the baseline benefit value;

determine whether the estimated gain value is greater than the gain reference value;

in response to determining that the estimated gain value is greater than the gain reference value, generate a first output in the interactive user interface recommending that the bulk request parameter-value be adjusted to the target value; and in response to determining that the estimated gain value is less than or equal to the gain reference value, generate a second output in the interactive user interface recommending that the bulk request parameter-value be maintained as is.

* * * * *